United States Patent
Toba et al.

(10) Patent No.: US 7,795,168 B2
(45) Date of Patent: Sep. 14, 2010

(54) POROUS INORGANIC OXIDE SUPPORT AND HYDROTREATING CATALYST OF CATALYTIC CRACKING GASOLINE USING THE SAME

(75) Inventors: Makoto Toba, Ibaraki (JP); Yuji Yoshimura, Ibaraki (JP); Nobuyuki Matsubayashi, Ibaraki (JP); Takashi Matsui, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 337 days.

(21) Appl. No.: 11/885,414

(22) PCT Filed: Feb. 28, 2006

(86) PCT No.: PCT/JP2006/003801
§ 371 (c)(1),
(2), (4) Date: Aug. 31, 2007

(87) PCT Pub. No.: WO2006/093170
PCT Pub. Date: Sep. 8, 2006

(65) Prior Publication Data
US 2009/0258780 A1    Oct. 15, 2009

(30) Foreign Application Priority Data
Mar. 1, 2005 (JP) .............................. 2005-055590

(51) Int. Cl.
*B01J 27/20* (2006.01)
(52) U.S. Cl. .................................. 502/177; 423/445 R
(58) Field of Classification Search .................. 502/177; 423/445 R
See application file for complete search history.

(56) References Cited

U.S. PATENT DOCUMENTS 5,468,709 A    11/1995   Yamaguchi et al.
6,761,761 B1 *  7/2004   Schilling et al. ......... 106/217.9
6,841,508 B2 *  1/2005   Moy et al. .................. 502/174

FOREIGN PATENT DOCUMENTS

| CN | 1339563 A   | 3/2002  |
|----|-------------|---------|
| JP | 1-296990    | 11/1989 |
| JP | 5-329380    | 12/1993 |
| JP | 6-226108    | 8/1994  |
| JP | 11-147707   | 6/1999  |
| JP | 2000-117112 | 4/2000  |
| JP | 2005-329320 | 12/2005 |
| WO | 2004/018097 | 3/2004  |

* cited by examiner

*Primary Examiner*—Timothy C Vanoy
*Assistant Examiner*—Michelle Hou
(74) *Attorney, Agent, or Firm*—Morgan, Lewis & Bockius LLP

(57) ABSTRACT

A porous inorganic oxide support comprising an oxygen-containing carbonaceous material supported thereon, preferably a porous inorganic oxide support wherein the oxygen-containing carbonaceous material is a carbide of an oxygen-containing organic compound, wherein the ratio of the supported carbon amount with respect to the mass of the support for preparing the catalyst is from 0.05 to 0.2, the atomic ratio of the supported hydrogen amount with respect to the supported carbon amount is from 0.4 to 1.0, and the atomic ratio of the supported oxygen amount with respect to the supported carbon amount is from 0.1 to 0.6; and a hydrotreating catalyst of catalytic cracking gasoline which comprises the support and a catalyst containing a Group 8 metal of the periodic table, molybdenum (Mo), phosphorus and sulfur which is supported on the support are useful as a desulfurization catalyst of, for example, catalytic cracking gasoline at a hyperdesulfurized level, because of having functions of suppressing the hydrogenation activity of olefins and minimizing the decrease in the octane number even under reaction conditions with a high desulfurization ratio.

4 Claims, No Drawings

POROUS INORGANIC OXIDE SUPPORT AND HYDROTREATING CATALYST OF CATALYTIC CRACKING GASOLINE USING THE SAME

TECHNICAL FIELD

The present invention relates to a porous inorganic oxide support comprising an oxygen-containing carbonaceous material supported thereon and a hydrotreating catalyst in which a catalyst containing molybdenum (Mo) and the like is supported on the support. In particular, it relates to a hydrotreating catalyst having a high desulfurization activity and a desulfurization selectivity when used in hydrotreatment in which a sulfur content in catalytic cracking gasoline is reduced and also hydrogenation of olefins and aromatics is suppressed.

BACKGROUND ART

From the viewpoint of environmental protection of city and roadside air and reduction of environmental burden on a global scale, it has been required to clean exhaust gas from automobiles and reduce the discharge of carbon dioxide. With regard to gasoline-powered automobiles, in order to reduce the discharge of carbon dioxide, it is required to improve fuel economy. Thus, thereafter, it is expected that high mileage automobiles having a direct-injection engine or a lean burn engine may increase. For these automobiles, a nitrogen oxide-reducing catalyst working under oxygen-excessive conditions (lean conditions) is necessary, which is different from a ternary catalyst which is a conventional nitrogen oxide-reducing catalyst. However, since the nitrogen oxide-reducing catalyst working under oxygen-excessive conditions (lean conditions) is poisoned by sulfur content and cleaning performance lowers, it is still required to achieve further decrease of the sulfur content in gasoline.

Currently, commercially available gasoline is prepared by mixing various base materials so as to satisfy the standard of an octane number. Among the materials, a catalytic cracking gasoline obtained by cracking, in a catalytically cracking apparatus, vacuum gas oil and atmospheric residue whose uses are limited as they are base materials having a high octane number and a mixing ratio thereof in the commercially available gasoline is as high as 40 to 70%. However, since starting materials of the catalytic cracking gasoline are vacuum gas oil and atmospheric residue containing a large amount of sulfur, the sulfur content of the resulting catalytic cracking gasoline is also higher than other base materials for gasoline. Therefore, in order to reduce the sulfur content of the commercially available gasoline produced by mixing various base materials, it is indispensable to desulfurize the catalytic cracking gasoline which is a main base material.

For reducing the sulfur content of the catalytic cracking gasoline, it is a common practice to use the vacuum gas oil and atmospheric residue after hydrodesulfurization as starting oils for catalytic cracking. However, an apparatus for the hydrodesulfurization of these heavy oils requires a high temperature and a high pressure and hence there exist many technical and economical problems in ultra-deep desulfurization of the staring oils.

Sulfur compounds contained in the catalytic cracking gasoline can be hydrodesulfurized by an apparatus requiring a relatively low temperature and a low pressure. Therefore, it is advantageous, if possible to directly hydrodesulfurize the catalytic cracking gasoline, since the process may be not only economically inexpensive but also can respond the case where the sulfur content of the starting oils for catalytic cracking is high.

With regard to the hydrotreating catalyst for the catalytic cracking gasoline, there have been conventionally widely used sulfide catalysts obtained by preparing an impregnating solution comprising a compound of molybdenum, a compound of a Group 8 metal of the periodic table, such as cobalt or nickel, and/or a phosphorus compound and supporting the solution in an oxide form on a porous inorganic oxide support such as alumina, silica, or zeolite, followed by activation through presulfuration. It is considered that the active sites for desulfurization in these sulfide catalysts are sulfur-coordinating unsaturated sites exhibited on a Group 8 metal-Group 6 metal-S structure (e.g., Co—Mo—S structure) formed at the edge site of a sulfide layer of molybdenum or tungsten which is a Group 6 metal. In order to improve the desulfurization activity, an attempt has been made to highly disperse the Group 6 metal sulfide. However, there arises a problem that when e catalytic cracking gasoline is hydrodesulfurized by a conventional hydrodesulfurization catalyst, olefins contained as high octane number components in the catalytic cracking gasoline are hydrogenated and thus the octane number decreases.

To overcome this problem, the present inventors previously proposed, as a hydrotreating catalyst having a low activity of hydrogenating olefins catalytic cracking gasoline and an excellent desulfurization performance, a hydrotreating catalyst of catalytic cracking gasoline, which comprises a Group 8 metal of the periodic table, molybdenum (Mo), phosphorus and sulfur, wherein the average coordination number [N(Mo)] of the molybdenum atoms around the molybdenum atom is from 1.5 to 2.5 and the average coordination number [N(S)] of the sulfur atoms around the molybdenum atom is from 3.5 to 5.0 when the $MoS_2$ structure in the catalyst is measured in accordance with the extended X-ray absorption fine structure (EXAFS) analysis (Patent Document 1).

Patent Document 1: JP-A-2005-329320

DISCLOSURE OF THE INVENTION

Problems that the Invention is to Solve

The above-mentioned catalyst has a low activity of hydrogenating olefins catalytic cracking gasoline and an excellent desulfurization performance. As the results of the subsequent studies, however, it has been clarified that this catalyst suffers from a problem that, when it is intended to further improve the desulfurization ratio by elevating the reaction temperature, the hydrogenation of olefins is also accelerated and thus the octane number is lowered.

An object of the present invention is to provide a porous inorganic oxide support having functions of suppressing the hydrogenation activity of olefins and minimizing the decrease in the octane number even under such reaction conditions as ensuring a high desulfurization ratio; and a hydrodesulfurizing catalyst of catalytic cracking gasoline using the same.

Means for Solving the Problems

The inventors have conducted various attempts to improve a hydrotreating catalyst of catalytic cracking gasoline. As a result, they found that a catalyst capable of satisfying the above requirements can be obtained by loading an oxygen-containing carbonaceous material on the surface of a porous inorganic oxide support to thereby suppress the tendency of basic olefins, which have been adsorbed and concentrated in acidic hydroxyl groups or electron-donating interstitial oxygen defects on a porous inorganic oxide support, toward hydrogenation. The present invention has been thus completed.

Accordingly, the present application provides the following inventions.

(1) A porous inorganic oxide support comprising an oxygen-containing carbonaceous material supported thereon.

(2) The porous inorganic oxide support according to (1), wherein the oxygen-containing carbonaceous material is a carbide of an oxygen-containing organic compound.

(3) The porous inorganic oxide support according to (1) or (2), wherein the oxygen-containing compound is a saccharide or the derivative thereof.

(4) The porous inorganic oxide support comprising an oxygen-containing carbonaceous material supported thereon according to any one of (1) to (3), wherein a ratio of a supported carbon amount with respect to a mass of the support for preparing the catalyst is from 0.05 to 0.2, wherein an atomic ratio of a supported hydrogen amount with respect to the supported carbon amount is from 0.4 to 1.0, and wherein an atomic ratio of a supported oxygen amount with respect to the supported carbon amount is from 0.1 to 0.6.

(5) A hydrotreating catalyst of catalytic cracking gasoline, which comprises the porous inorganic oxide support according to any one of (1) to (4); and a catalyst containing a Group 8 metal of the periodic table, molybdenum (Mo), phosphorus and sulfur, which is supported on the porous inorganic oxide support.

(6) The hydrotreating catalyst of catalytic cracking gasoline according to claim (5), wherein the average coordination number [N(Mo)] of the molybdenum atoms around the molybdenum atom is from 1.5 to 2.5 and the average coordination number [N(S)] of the sulfur atoms around the molybdenum atom is from 3.5 to 5.0 when $MoS_2$ structure in the catalyst is measured in accordance with the extended X-ray absorption fine structure (EXAFS) analysis.

ADVANTAGE OF THE INVENTION

In the porous inorganic oxide support according to the present invention, which comprises an oxygen-containing carbonaceous material supported thereon, the adsorption of olefins on the support is suppressed by the oxygen-containing carbonaceous material supported on the support. Accordingly, a hydrotreating catalyst using the porous inorganic oxide support as the support has a high desulfurization activity and an excellent function of suppressing the hydrogenation of olefins and aromatics, which makes it highly suitable as a selective hydrodesulfurization catalyst at a hyperdesulfurized level for catalytic cracking gasoline and the like.

In particular, a combination of a support, in which the ratio of the supported carbon amount with respect to the mass of the support for preparing the catalyst is from 0.05 to 0.2, the atomic ratio of the supported hydrogen amount with respect to the supported carbon amount is from 0.4 to 1.0, and the atomic ratio of the supported oxygen amount with respect to the supported carbon amount is from 0.1 to 0.6, with a catalyst containing a Group 8 metal of the periodic table, molybdenum (Mo), phosphorus and sulfur has functions of suppressing the hydrogenation activity of olefins and minimizing the decrease in the octane number under reaction conditions with a high desulfurization ratio. As clearly shown in the comparison of Examples with Comparative Examples as will be shown hereinafter, the above-described catalyst is superior in the desulfurization activity and the function of suppressing the hydrogenation activity of olefins and aromatics to a catalyst with the use of a porous inorganic oxide support not supporting an oxygen-containing carbonaceous material. Thus, it is highly useful as a desulfurization catalyst at a hyperdesulfurized level of catalytic cracking gasoline.

The support according to the present invention is characterized in that an oxygen-containing carbonaceous material is supported on a porous inorganic oxide support.

As the porous inorganic oxide support, any supports used for the usual hydrotreating catalysts can be employed. Examples thereof include alumina, silica, titania, zirconia, alumina-silica, alumina-titania, alumina-boria, alumina-phosphorus, silica-titania, alumina-silica-titania, alumina-silica-boria, alumina-phosphorus-boria, alumina-titania-boria, alumina-silica-phosphorus, alumina-titania-phosphorus-boria, Y-type zeolite, X-type zeolite, L-type zeolite, β-type zeolite, chabazite, erionite, mordenite, ZSM zeolite, MFI zeolite and the like. In particular, alumina-containing supports, such as alumina, alumina-silica, alumina-titania, alumina-boria, alumina-silica-boria and alumina-phosphorus-boria, are preferred because of having a large specific surface area and a large pore volume.

The specific surface area, pore volume, and average pore radius of the support is not particularly limited, but the specific surface area is preferably from 10 to 600 $m^2/g$, particularly preferably from 50 to 500 $m^2/g$. The support having a specific surface area of less than 10 $m^2/g$ exhibits a poor dispersibility for the other metal components and a suitable desulfurization performance cannot be achieved. Moreover, the support having a specific surface area of more than 600 $m^2/g$ brings about a decrease of pore size and exhibits a poor dispersibility for the reactants and hence it is not preferred. The pore volume is preferably 0.2 cc/g or more, particularly preferably from 0.3 to 1.0 cc/g. The pore radius can be suitably selected depending on the kind of oil to be treated. In the hydrotreatment of a gasoline fraction, for example, the support having an average pore diameter of 50 to 110 Å is preferred.

The oxygen-containing organic compound supported on the support is not particularly restricted so long as it forms a carbonaceous material. By taking the compatibility with the support, easiness in caramelization accompanying carbonization and easiness in the expression of hydroxyl and carboxyl groups that is essentially required in stabilizing metallic component at the impregnation into consideration, a saccharide or a saccharide derivative may be preferably used.

The saccharide derivative herein refers to a compound wherein a saccharide is functionalized, e.g., oxidized, reduced, or esterified, and means a compound containing one or more carboxyl groups and three or more alcohol groups (alcoholic hydroxyl groups) which act as ligands in the compound. Examples of the saccharide include a monosaccharide such as aldose or ketose typified by D-glucose and D-galactose, a disaccharide such as sucrose or maltose, and a polysaccharide such as starch. Examples of the saccharide derivative include those having a structure containing both of polyhydric alcohol and a carboxyl group, e.g., aldonic acids (one carboxyl group and five alcohol groups) such as gluconic acid and mannonic acid; saccharic acids (sugar acids; two carboxyl groups and four alcohol groups) such as saccharic acid, mannosaccharic acid, and mucic acid; uronic acids (one carboxyl group and four alcohol groups) such as glucuronic acid and galactouronic acid; lactones such as glucolactone wherein an acid formed by the oxidation of a saccharide forms a cyclic ester in the molecule; and the like. Either one of these saccharides and saccharides derivatives or two or more thereof may be used in combination.

The amount of the oxygen-containing carbonaceous material to be supported by the support is preferably from 5% by mass to 20% by mass, more preferably from 5% by mass to 15% by mass, in terms of carbon based on the support weight. When the amount is 5% or less, the support cannot be sufficiently coated and hydrogenation cannot be sufficiently suppressed due to the adsorption of olefins. When the amount exceeds 20% by mass, the support pores become narrower and the active metal component cannot be uniformly dispersed in the support particles, which results in a decrease in the desulfurization activity.

Although the carbonization conditions are not particularly restricted, it is preferable from the viewpoint of retaining the active metal to carry out the carbonization while allowing oxygen to remain so as to give an atomic ratio of the supported oxygen amount with respect to the supported carbon amount of from 0.1 to 0.6. When the atomic ratio of the supported oxygen amount with respect to the supported carbon amount is 0.1 or less, the hydrophobic nature on the support surface is elevated and the active metal component cannot be sufficiently retained. In this case, there arises a problem of the occurrence of the aggregation or separation of the active metal. When the atomic ratio of the supported oxygen amount with respect to the supported carbon amount exceeds 0.6, the caramelization accompanying the carbonization proceeds only insufficiently and thus the catalyst is dissolved into the supporting solution. As a result, the active metal is coated or the supported oxygen-containing carbonaceous material per se is eluted or reacted in the course of the desulfurization reaction, which results in a decrease in the activity.

It is preferable to carry out the carbonization in such manner as to control the atomic ratio of the supported hydrogen amount with respect to the supported carbon amount, which is an important indication of the carbonization, to 0.4 to 1.0. When the atomic ratio of the supported hydrogen amount with respect to the supported carbon amount is 0.4 or less, the hydrophobic nature on the support surface is elevated and the active metal component cannot be sufficiently retained. In this case, there arises a problem of the occurrence of the aggregation or separation of the active metal. When the atomic ratio of the supported hydrogen amount with respect to the supported carbon amount exceeds 1.0, the caramelization accompanying the carbonization proceeds only insufficiently and thus the supported oxygen-containing carbonaceous material per se is liable to react in the course of the desulfurization reaction, which results in a decrease in the activity.

The hydrotreating catalyst of catalytic cracking gasoline according to the present invention can be obtained by supporting a hydrotreating catalyst on the above-described support, which is preferably a support supporting an oxygen-containing carbonaceous material obtained by impregnating a porous inorganic oxide support with an oxygen-containing organic compound and carrying out carbonization in such a manner as to give a carbon amount of from 5% by mass to 20% by mass, preferably from 5% by mass to 15% by mass, based on the mass of the porous inorganic oxide support; an atomic ratio of the supported hydrogen amount with respect to the supported carbon amount of from 0.4 to 1.0; and an atomic ratio of the supported oxygen amount with respect to the supported carbon amount is from 0.1 to 0.6.

Although the hydrotreating catalyst is not particularly restricted, it is preferable to use a catalyst containing a Group 8 metal of the periodic table, molybdenum (Mo), phosphorus and sulfur.

It is further preferable to use a catalyst in which the average coordination number [N(Mo)] of the molybdenum atoms around the molybdenum atom is from 1.5 to 2.5 and the average coordination number [N(S)] of the sulfur atoms around the molybdenum atom is from 3.5 to 5.0 when $MoS_2$ structure in the catalyst is measured in accordance with the extended X-ray absorption fine structure (EXAFS) analysis.

As the form of the compound of molybdenum to be introduced in the supporting solution, in addition to a metal oxide such as molybdenum oxide, a metal salt such as a halide, a sulfate or an organic acid salt can be employed. In consideration of the residual unnecessary components in the catalyst and an exhaust gas at the following burning step, however, it is preferred to use a metal oxide or an organic acid salt.

The total content of molybdenum is preferably from 5 to 20% by weight, particularly from 6 to 15% by weight, in terms of oxide, based on the weight of the catalyst. When the content is 5% by weight or less, lamination of molybdenum sulfide layers hardly occurs and a sufficient desulfurization activity is not obtained due to a strong interaction between molybdenum sulfide and the support. On the other hand, when the content exceeds 20% by weight, since lamination of the molybdenum sulfide layers occurs on the support surface and an exposed amount of the active edge part of the sulfide layers increases, a sufficient desulfurization activity is obtained but hydrogenation of olefins simultaneously proceeds, so that selective desulfurization cannot be achieved.

Although the structure of molybdenum sulfide is not particularly restricted, it is preferable, as discussed above, that the average coordination number [N(Mo)] of the molybdenum atoms around the molybdenum atom is from 1.5 to 2.5 and the average coordination number [N(S)] of the sulfur atoms around the molybdenum atom is from 3.5 to 5.0 when $MoS_2$ structure in the catalyst is measured in accordance with the extended X-ray absorption fine structure (EXAFS) analysis.

When the average coordination number [N(Mo)] of the molybdenum atoms around the molybdenum atom is less than 1.5, the degree of $MoS_2$ dispersion is high whereas the degree of crystallinity is low, and the quality of the desulfurization active sites is degraded through the interaction with the support, so that a low desulfurization activity and a low olefin hydrogenation activity are observed. When the average coordination number [N(Mo)] of the molybdenum atoms around the molybdenum atom is 2.5 or more, the degree of $MoS_2$ dispersion is low whereas the degree of crystallinity is high, and a high desulfurization activity and a high olefin hydrogenation activity are observed. When the average coordination number [N(S)] of the sulfur atoms around the molybdenum atom is less than 3.5, the desulfurization active sites are not sufficiently formed and thus the desulfurization activity becomes low. When the average coordination number [N(S)] of the sulfur atoms around the molybdenum atom is 5 or more, the hydrogen from the SH group formed on the sulfur participates in the reaction, so that the olefin hydrogenation activity becomes high.

As the Group 8 metal of the periodic table, use can be made of one or more species selected from among iron, cobalt, nickel and the like. As the form of the compound to be introduced into the supporting solution, a metal salt such as a nitrate, a halide, a sulfate, a carbonate, a hydroxide, or an organic acid salt can be used. In consideration of the residual unnecessary components in the catalyst and an exhaust gas at the following burning step, however, it is particularly preferred to use a metal oxide, a hydroxide, or an organic acid salt.

The total content of the Group 8 metal of the periodic table is preferably from 0.5 to 8% by weight, particularly from 1 to 6% by weight, in terms of oxide, based on the weight of the catalyst, and the content based on molybdenum is preferably from 25 to 75% by mol as a metal molar ratio.

As the phosphorus compound, use can be made of ammonium dihydrogen phosphate (number of binding hand=1), diammonium hydrogen phosphate (number of binding hands=2), trimetaphosphoric acid (number of binding hands=3), pyrophosphoric acid (number of binding hands=4), or tripolyphosphoric acid (number of binding hands=5), though the use of ammonium dihydrogen phosphate is particularly preferred in view of the stable complex formation with an organic acid to be mentioned below. The amount of the phosphorus is preferably from 0.5 to 10% by weight, particularly from 1 to 5% by weight, in terms of metal, based on the catalyst, and the content based on molybdenum is preferably from 20 to 200% by mol.

In the present invention, in order to uniformly dissolve these metal components stably, it is preferable to use a saccharide derivative, which is a multidentate ligand, capable of easily coordinating to the metal components to form a stable composite complex.

As the saccharide derivative, use may be made of those cited above. The saccharide derivatives may be used singly or in combination of two or more thereof. By using such a specific multidentate ligand, a supporting solution having an improved stability and an elevated uniformity can be obtained.

Although the concentration of the saccharide derivative in the supporting solution for use in the present invention cannot be categorically defined since it may vary depending on kind of the metal compound used and the amount thereof, the amount of the saccharide derivative is preferably from 30 to 200% by mol, particularly from 50 to 150% by mol, based on the amount of the Group 8 metal of the periodic table.

To support the impregnating solution on the oxygen-containing carbonaceous material-supporting porous inorganic oxide support, it is possible to employ a method commonly employed in producing a hydrotreating catalyst. For example, use may be made of the method which includes supporting the impregnating solution on the above-described oxygen-containing carbonaceous material-supporting porous inorganic oxide support by a publicly known impregnation method, the method which includes kneading an oxygen-containing carbonaceous material-supporting inorganic oxide precursor with the impregnating solution followed by shaping, drying and baking, or the like.

The hydrodesulfurization catalyst according to the present invention can be produced by impregnating the above support with the above supporting solution to introduce predetermined metal components, subsequently drying the product, and further subjecting it to presulfuration. In this case, the operation for impregnating the support with the supporting solution is not particularly restricted in the mode and conditions thereof, so long as the supporting solution can be brought into contact with the support thereby. For example, use can be made of any publicly known method for impregnation, such as impregnation, wet adsorption, wet kneading, spraying, coating, dipping, or the like or a combination thereof.

The drying method is not particularly limited, but it is preferred that the product obtained by impregnating the above support with the supporting solution (hereinafter sometimes referred to as an impregnated product) is dried by evaporating the water content through irradiation with a microwave. The microwave has usually a frequency ranging from 1 GHz to 1000 GHz, preferably from 1 GHz to 10 GHz. In particular, the microwave having a frequency of 2.45 GHz is particularly suitable since it is the same as the microwave of the microwave oven used at home and water molecules are heated by resonance.

Moreover, in the irradiation with the microwave, it is desirable to control the intensity of the microwave and the irradiation time so that the water content of the impregnated product is reduced by 20% by weight or more, preferably 40% by weight or more, and more preferably 50 to 100% by weight, of the water content before irradiation. Since the above-described impregnated product is dried by applying heat in the conventional drying method, the surface of the impregnated product is first heated and hence the temperature of the surface is initially higher than that of the inside. Therefore, water migrates from the inside to the outer surface of the impregnated product and thus a hydrogenation active component migrates to the outer surface along with the migration of water. As a result, the dispersed state of the hydrogenation active component becomes uneven and hence a sufficient catalytic performance is not necessarily exhibited in many cases. When the above-described impregnated product is irradiated with the microwave, in contrast thereto, water molecules contained in the impregnated product rotate at a high speed by the microwave and friction heat is generated to elevate the temperature of the whole impregnated product. In this case, therefore, no temperature difference between the inside and the surface part occurs. Thus, little migration of water from the inside to the outer surface of the impregnated product occurs and thus the hydrogenation active component is supported at a uniformly dispersed state.

Furthermore, it is also possible in the present invention to obtain the hydrotreating catalyst by a commonly employed drying method, for example, burning the product at a temperature of 200 to 600° C. for 0.1 to 10 hours after the above-described drying step.

As discussed above, it is preferable in the invention that the impregnating solution for the hydrotreating catalyst is an aqueous solution containing molybdenum (Mo) which is the active metal component of the hydrotreating catalyst.

Although a Group 6A metal or a Group 8 metal of the periodic table is generally used as the active metal component of a hydrotreating catalyst, a hydrotreating catalyst using a molybdenum compound exhibits a particularly high desulfurization activity and, therefore, is widely used. The impregnating solution for the hydrotreating catalyst may contain an active metal component usually used for the hydrotreating catalyst, such as a tungsten, cobalt, nickel or phosphorus compound, in addition to the molybdenum compound. Moreover, each metal component can be contained in an amount which falls within a usual composition range of the active metal component in a hydrotreating catalyst. It is particularly preferable that the impregnating solution for the hydrotreating catalyst of the present invention contains molybdenum (Mo) and cobalt (Co).

The impregnating solution for hydrotreating catalyst is prepared by dissolving a molybdenum compound to be used for preparing a usual impregnating solution for hydrotreating catalysts, such as molybdenum trioxide or ammonium paramolybdate, using gluconic acid as a complexing agent (chelating agent). When cobalt or nickel is used in combination with molybdenum as metal components, a cobalt compound, such as basic cobalt carbonate, cobalt nitrate or cobalt sulfate, or a nickel compound, such as basic nickel carbonate, nickel nitrate or nickel sulfate, can be employed in addition to the above-described molybdenum compound. As a further preferable specific example, there may be mentioned a method for preparing the solution by adding predetermined amounts of molybdenum trioxide and basic nickel carbonate to water, stirring the mixture with moisturization, subsequently adding an aqueous gluconic acid solution, and further stirring the resulting mixture with moisturization. However, the method for preparing the impregnating solution is not limited to the above method.

In using the hydrotreating catalyst of the present invention, use may be made of the hydrotreatment conditions commonly employed. The target oil to be hydrogenated is not particularly limited, and most suitable are gasoline fractions having a boiling point range of 30 to 260° C. and a sulfur concentration of 0.2% by weight or less, such as catalytic cracking gasoline and straight-run naphtha. In particular, the hydrodesulfurization catalyst obtainable by the present invention is preferably usable as a catalyst for selective hydrodesulfurization of gasoline fractions, more specifically hydrodesulfurization of catalytic cracking gasoline containing an olefin content of 10 to 50%.

EXAMPLES

Now, the present invention will be described in greater detail by referring to the following Examples and Comparative Examples. However, the present invention is not restricted thereto.

Example 1

Preparation of Catalyst (1) Preparation of Oxygen-containing Carbonaceous Material-supporting Support In preparing of a catalyst, use was made, as a support material, of γ-alumina (shape: 1/16 inch cylinder) which is a porous inorganic oxide. The surface area of the support material was 195 m$^2$/g and the pore volume thereof was 0.80 cm$^3$/g. To a 100 ml beaker, 20.5 g of a 50% gluconic acid solution and 23.1 ml of water were added and stirred at room temperature for 1 hour. 50 g of γ-alumina was impregnated with 40 ml of the obtained solution. Next, this impregnated product was irradiated with a microwave having a frequency of 2.45 GHz for 10 minutes. After drying, the whole dried product was thermally treated in a nitrogen gas stream at 360° C. for 2 hours. Thus, Oxygen-containing carbonaceous material-supporting support a was obtained.

(2) Preparation of Impregnating Solution

To a 2,000 ml beaker, 1,500 ml of water and 64.0 g of molybdenum trioxide were added and stirred at 95° C. for 10 hours. Then, 28.0 g of basic cobalt carbonate was added thereto, followed by stirring at 95° C. for 5 hours. The obtained mixture was cooled to 75° C. and 130.0 g of a 50% gluconic acid solution (gluconic acid/cobalt=1.5/1 (mol/mol)) was added thereto. Then, the resultant mixture was stirred at the same temperature for 5 hours. The solution thus obtained was concentrated to 320 ml and subsequently 10.0 g of ammonium dihydrogen phosphate was added and dissolved. Thus, an aqueous Co—Mo—P-gluconic acid solution was prepared.

(3) Preparation of Catalyst

The aqueous Co—Mo—P-gluconic acid solution prepared in (2) was supported on Oxygen-containing carbonaceous material-supporting support a of (1) by an impregnation method. Namely, 60 g of Oxygen-containing carbonaceous material-supporting support a was impregnated with 40 ml of the above aqueous impregnating solution. Next, the impregnated product was dried by irradiating with a microwave having a frequency of 2.45 GHz for 10 minutes. Thus, Catalyst A was prepared.

Example 2

Preparation of Catalyst (1) Preparation of Oxygen-Containing Carbonaceous Material-supporting Support To a 100 ml beaker, 40.9 g of a 50% gluconic acid solution and 6.3 ml of water were added and stirred at room temperature for 1 hour. 50 g of the same γ-alumina as in Example 1 was impregnated with 40 ml of the obtained solution. Next, this impregnated product was irradiated with a microwave having a frequency of 2.45 GHz for 10 minutes. After drying, the whole dried product was thermally treated in a nitrogen gas stream at 360° C. for 2 hours. Thus, Oxygen-containing carbonaceous material-supporting support b was obtained.

(2) Preparation of Impregnating Solution

The same impregnation solution as in Example 1 was employed.

(3) Preparation of Catalyst

The aqueous Co—Mo—P-gluconic acid solution of (2) was supported on Oxygen-containing carbonaceous material-supporting support a of (1) by an impregnation method. Namely, 70 g of Oxygen-containing carbonaceous material-supporting support b was impregnated with 40 ml of the above aqueous impregnating solution. Next, the impregnated product was dried by irradiating with a microwave having a frequency of 2.45 GHz for 10 minutes. Thus, Catalyst B was prepared.

Example 3

Preparation of Catalyst (1) Preparation of Oxygen-containing Carbonaceous Material-supporting Support In a 100 ml beaker, water was added to 37.1 g of glucoltactone. After dissolving, the total volume was adjusted to 40 ml and the solution was stirred at room temperature for 1 hour. 50 g of the same γ-alumina as in Example 1 was impregnated with 40 ml of the obtained solution. Next, this impregnated product was irradiated with a microwave having a frequency of 2.45 GHz for 10 minutes. After drying, the whole dried product was thermally treated in a nitrogen gas stream at 360° C. for 2 hours. Thus, Oxygen-containing carbonaceous material-supporting support c was obtained.

(2) Preparation of Impregnating Solution

The same impregnation solution as in Example 1 was employed.

(3) Preparation of Catalyst

The aqueous Co—Mo—P-gluconic acid solution of (2) was supported on Oxygen-containing carbonaceous material-supporting support c of (1) by an impregnation method. Namely, 90 g of Oxygen-containing carbonaceous material-supporting support b was impregnated with 40 ml of the above aqueous impregnating solution. Next, the impregnated product was dried by irradiating with a microwave having a frequency of 2.45 GHz for 10 minutes. Thus, Catalyst C was prepared.

Example 4

Preparation of Catalyst (1) Preparation of Oxygen-containing Carbonaceous Material-supporting Support To a 100 ml beaker, 40.9 g of a 50% gluconic acid solution and 6.3 ml of water were added and stirred at room temperature for 1 hour. 50 g of the same γ-alumina as in Example 1 was impregnated with 40 ml of the obtained solution. Next, this impregnated product was irradiated with a microwave having a frequency of 2.45 GHz for 10 minutes. After drying, the whole dried product was thermally treated in a nitrogen gas stream at 400° C. for 2 hours. Thus, Oxygen-containing carbonaceous material-supporting support d was obtained.

(2) Preparation of Impregnating Solution

The same impregnation solution as in Example 1 was employed.

(3) Preparation of Catalyst

The aqueous Co—Mo—P-gluconic acid solution of (2) was supported on Oxygen-containing carbonaceous material-supporting support d of (1) by an impregnation method. Namely, 70 g of Oxygen-containing carbonaceous material-supporting support b was impregnated with 40 ml of the above aqueous impregnating solution. Next, the impregnated product was dried by irradiating with a microwave having a frequency of 2.45 GHz for 10 minutes. Thus, Catalyst D was prepared.

Example 5

Preparation of Catalyst (1) Preparation of Oxygen-containing Carbonaceous Material-supporting Support To a 100 ml beaker, 40.9 g of a 50% gluconic acid solution and 6.3 ml of water were added and stirred at room temperature for 1 hour. 50 g of the same γ-alumina as in Example 1 was impregnated with 40 ml of the obtained solution. Next, this impregnated product was irradiated with a microwave having a frequency of 2.45 GHz for 10 minutes. After drying, the whole dried product was thermally treated in a nitrogen gas stream at 280° C. for 2 hours. Thus, Oxygen-containing carbonaceous material-supporting support e was obtained.

(2) Preparation of Impregnating Solution

The same impregnation solution as in Example 1 was employed.

(3) Preparation of Catalyst

The aqueous Co—Mo—P-gluconic acid solution of (2) was supported on Oxygen-containing carbonaceous material-supporting support d of (1) by an impregnation method. Namely, 70 g of Oxygen-containing carbonaceous material-supporting support b was impregnated with 40 ml of the above aqueous impregnating solution. Next, the impregnated product was dried by irradiating with a microwave having a frequency of 2.45 GHz for 10 minutes. Thus, Catalyst E was prepared.

Example 6

Preparation of Catalyst (1) Preparation of Oxygen-containing Carbonaceous Material-supporting Support In a 100 ml beaker, water was added to 17.8 g of sucrose. After dissolving, the total volume was adjusted to 40 ml and the solution was stirred at room temperature for 1 hour. 50 g of the same γ-alumina as in Example 1 was impregnated with 40 ml of the obtained solution. Next, this impregnated product was irradiated with a microwave having a frequency of 2.45 GHz for 10 minutes. After drying, the whole dried product was thermally treated in a nitrogen gas stream at 360° C. for 2 hours. Thus, Oxygen-containing carbonaceous material-supporting support f was obtained.

(2) Preparation of Impregnating Solution

The same impregnation solution as in Example 1 was employed.

(3) Preparation of catalyst

The aqueous Co—Mo—P-gluconic acid solution of (2) was supported on Oxygen-containing carbonaceous material-supporting support a of (1) by an impregnation method. Namely, 69 g of Oxygen-containing carbonaceous material-supporting support b was impregnated with 40 ml of the above aqueous impregnating solution. Next, the impregnated product was dried by irradiating with a microwave having a frequency of 2.45 GHz for 10 minutes. Thus, Catalyst F was prepared.

Example 7

Preparation of Catalyst (1) Preparation of Oxygen-containing Carbonaceous Material-supporting Support In a 100 ml beaker, water was added to 18.8 g of glucose. After dissolving, the total volume was adjusted to 40 ml and the solution was stirred at room temperature for 1 hour. 50 g of the same γ-alumina as in Example 1 was impregnated with 40 ml of the obtained solution. Next, this impregnated product was irradiated with a microwave having a frequency of 2.45 GHz for 10 minutes. After drying, the whole dried product was thermally treated in a nitrogen gas stream at 360° C. for 2 hours. Thus, Oxygen-containing carbonaceous material-supporting support g was obtained.

(2) Preparation of Impregnating Solution

The same impregnation solution as in Example 1 was employed.

(3) Preparation of Catalyst

The aqueous Co—Mo—P-gluconic acid solution of (2) was supported on Oxygen-containing carbonaceous material-supporting support g of (1) by an impregnation method. Namely, 70 g of Oxygen-containing carbonaceous material-supporting support b was impregnated with 40 ml of the above aqueous impregnating solution. Next, the impregnated product was dried by irradiating with a microwave having a frequency of 2.45 GHz for 10 minutes. Thus, Catalyst G was prepared.

Example 8

Preparation of Catalyst (1) Preparation of Oxygen-containing Carbonaceous Material-supporting Support The same oxygen-containing carbonaceous material b as used in Example 2 was obtained.

(2) Preparation of Impregnating Solution

To a 2,000 ml beaker, 1,500 ml of water and 64.0 g of molybdenum trioxide were added and stirred at 95° C. for 10 hours. Then, 28.0 g of basic cobalt carbonate was added thereto, followed by stirring at 95° C. for 5 hours. The obtained mixture was cooled to 75° C. and 130.0 g of a 50% gluconic acid solution (gluconic acid/cobalt=1.5/1 (mol/mol)) was added thereto. Then, the resultant mixture was stirred at the same temperature for 5 hours. The solution thus obtained was concentrated to 424 ml and subsequently 10.0 g of ammonium dihydrogen phosphate was added and dissolved. Thus, an aqueous Co—Mo—P-gluconic acid solution was prepared.

(3) Preparation of Catalyst

The aqueous Co—Mo—P-gluconic acid solution prepared in (2) was supported on Oxygen-containing carbonaceous material-supporting support b of (1) by an impregnation method. Namely, 70 g of Oxygen-containing carbonaceous material-supporting support b was impregnated with 40 ml of the above aqueous impregnating solution. Next, the impregnated product was dried by irradiating with a microwave having a frequency of 2.45 GHz for 10 minutes. Thus, Catalyst H was prepared.

Comparative Example 1

Preparation of Catalyst (1) Preparation of Support

The same γ-alumina as in Example 1 was used.

(2) Preparation of Impregnating Solution

The same impregnation solution as in Example 1 was employed.

(3) Preparation of Catalyst

The aqueous Co—Mo—P-gluconic acid solution of (2) was supported on γ-alumina of (1) by an impregnation method. Namely, 50 g of γ-alumina was impregnated with 40 ml of the above aqueous impregnating solution. Next, the impregnated product was dried by irradiating with a microwave having a frequency of 2.45 GHz for 10 minutes. Thus, Catalyst I was prepared.

Comparative Example 2

Preparation of Catalyst (1) Preparation of Support

The same γ-alumina as in Example 1 was used.

(2) Preparation of Impregnating Solution

The same impregnation solution as in Example 8 was employed.

(3) Preparation of Catalyst

The aqueous Co—Mo—P-gluconic acid solution of (2) was supported on γ-alumina of (1) by an impregnation method. Namely, 50 g of γ-alumina was impregnated with 40 ml of the above aqueous impregnating solution. Next, the impregnated product was dried by irradiating with a microwave having a frequency of 2.45 GHz for 10 minutes. Thus, Catalyst J was prepared.

Comparative Example 3

Marketed Catalyst

Catalyst K (CoMO/$Al_2O_3$ catalyst), which is a marketed catalyst for desulfurization of gasoline fractions, was employed.

(Analysis of Catalysts: the Limitation of Physical Properties in the Claims is also Defined by the Following Analytical Means)

Using Catalysts A to H prepared in Examples 1 to 8 and Catalysts I to K prepared in Comparative Examples 1 to 3, each local structure of the molybdenum sulfide supported on the alumina support was analyzed by the extended X-ray absorption fine structure (EXAFS) analysis. For the EXAFS measurement, a transmission X-ray absorption spectrophotometric device using a 50% argon-50% nitrogen gas ionization chamber and an argon gas ionization chamber respectively as an incident X-ray intensity detector and a transmission X-ray intensity detector was used in a hard X-ray beam line (BLL10B) equipped with a silicon(311) channel-cut crystal spectroscopic device at Radiation Research facility of Institute of Material Structure Science in High Energy Accelerator Research Organization. The measurement was carried out on a molybdenum K absorption edge at 600 measuring points for an integration time of 2 to 6 seconds/measuring point within the range of 300 eV before the absorption edge to 1,500 eV after the absorption edge.

Each catalyst sample was pulverized into 100- to 200-mesh and then packed into a reaction tube made of glass. Under a stream of a mixed gas of 5% hydrogen sulfide/95% hydrogen, the packed sample was sulfurated under heating from room temperature to a predetermined temperature of 320° C. at a temperature-elevating rate of 1° C./min and sulfuration was continued at that temperature for further 3 hours (standard sulfuration). Thereafter, under a stream of a mixed gas of 5% hydrogen sulfide/95% hydrogen, the packed sample was cooled to 150° C., and after the stream was switched to 100% hydrogen gas, it was further cooled. After the stream was switched to 100% nitrogen gas at 50° C., it was furthermore cooled to room temperature. The nitrogen-enclosed glass reaction tube was transferred into a globe box substituted with nitrogen and a sulfurated powdery catalyst sample was press-molded using a tablet-molding device having a diameter of 10 mm. The molded sample was put into a polyethylene pack of 700 mm×1000 mm together with argon followed by sealing to give an EXAFS-measuring sample. The EXAFS sample preparation involving a series of the catalyst sulfuration processes and the disk-molding operation was performed on the day before the EXAFS measurement.

The analysis was carried out by subtracting the background absorption according to a smoothing method by cubic splain function to normalize an EXAFS vibrational component and then obtaining a radial distribution function around absorptive element (molybdenum) by Fourier transformation. Using $MoS_2$ edge crystal as a standard sample, the average coordination number of the sulfur atoms [N(S)] and the average coordination number of the molybdenum atoms [N(Mo)] around molybdenum were determined from the EXAFS radial distribution function of molybdenum on the alumina support of each catalyst, referring that the peak intensities of MO-S (0.242 nm) (triangular prism-type coordination) and Mo—Mo (0.316 nm) (in-plane hexagonal coordination) correspond to the number of sulfur atoms directly bonded to molybdenum and the number of closest molybdenum atoms around molybdenum, respectively. Since $MoS_2$ single crystal has N(Mo) of 6 and N(S) of 6, the closer to 6 the N(Mo) and N(S) are, the higher the degree of MoS$_2$ crystallinity is. Also, the higher the N(S) is, the higher the degree of sulfuration is. As shown in Table 1, it is revealed that Catalysts A, B, C, D, E, F and G according to Examples of the present invention each have a high degree of crystallinity of MoS$_2$ crystal and a high degree of sulfuration since the average coordination number of the molybdenum atoms [N(Mo)] is large and the average coordination number of the sulfur atoms [N(S)] is large compared with Catalyst I of Comparative Example supporting the same amount of the active metal. Similarly, it can be understood that Catalyst H according to Example of the present invention has a high degree of crystallinity of MoS$_2$ crystal and a high degree of sulfuration since the average coordination number of the molybdenum atoms [N(Mo)] is large and the average coordination number of the sulfur atoms [N(S)] is large compared with Catalyst I of Comparative Example supporting the same amount of the active metal.

TABLE 1

| Catalyst | Active metal | Support | Carbon/alumina wt. ratio | Atomic ratio H/C | Atomic ratio O/C | Coordination number determined by EXAFS N(Mo) | Coordination number determined by EXAFS N(S) |
|---|---|---|---|---|---|---|---|
| Ex. 1 | A | CoMo | a | 0.053 | 0.72 | 0.19 | 2.2 | 4.7 |
| Ex. 2 | B | CoMo | b | 0.107 | 0.72 | 0.19 | 2.3 | 4.9 |
| Ex. 3 | C | CoMo | c | 0.198 | 0.72 | 0.19 | 2.4 | 5.0 |
| Ex. 4 | D | CoMo | d | 0.086 | 0.41 | 0.10 | 2.4 | 5.0 |
| Ex. 5 | E | CoMo | e | 0.180 | 1.00 | 0.55 | 2.2 | 4.5 |
| Ex. 6 | F | CoMo | f | 0.140 | 0.66 | 0.20 | 2.4 | 5.0 |
| Ex. 7 | G | CoMo | g | 0.133 | 0.70 | 0.24 | 2.3 | 4.9 |
| Ex. 8 | H | CoMo | b | 0.107 | 0.72 | 0.19 | 2.0 | 4.1 |
| Comp. Ex. 1 | I | CoMo | alumina alone | 0 | — | — | 1.9 | 4.5 |
| Comp. Ex. 2 | J | CoMo | alumina alone | 0 | — | — | 1.7 | 3.9 |
| Comp. Ex. 3 | K | CoMo | alumina alone | 0 | — | — | 1.4 | 3.5 |

(Evaluation 1 of Catalysts)

Using Catalysts A to H prepared in Examples 1 to 8 and Catalysts I to K prepared in Comparative Examples 1 to 3, the hydrodesulfurization activity and hydrogenation activity were evaluated on heavy catalytic cracking gasoline (residual fraction after a light fraction was removed at a distillation temperature of 60° C.) having the properties shown in Table 2. After packing 250 mg of each catalyst into a reaction tube, presulfuration was carried out at 320° C. for 3 hours in a stream composed of 5% hydrogen sulfide/95% hydrogen and followed by the reaction. Namely, 250 mg of the catalyst was packed into a reaction tube, then subjected to presulfuration at 320° C. for 3 hours in a stream composed of 5% hydrogen sulfide/95% hydrogen and then used in the reaction. The conditions for the reaction for evaluating of hydrodesulfurization activity were as follows: reaction temperature of 240° C., reaction pressure of 1.0 MPa, LHSV$^-$ of 4 h$^{-1}$, and a of hydrogen/oil ratio of 100 NL (based on standard conditions converted to 0° C. and 1 atm)/L. For quantifying the sulfur concentration, a TS-100V device manufactured by Dia Instruments Co., Ltd. was used. Moreover, for the quantitative analysis of paraffins, isoparaffins, naphthenes and aromatics, a gas chromatograph (GPI system) manufactured by Yokogawa Analytical Systems was used. The research octane number calculated by this gas chromatography was regarded as GC-RON. A desulfurization rate was calculated from the sulfur amount-reduction rate in the starting material, an olefin hydrogenation rate was calculated from the olefin-reduction rate in the starting material, and further an aromatic hydrogenation rate was calculated from aromatic-reduction rate in the starting material according to the following expressions.

TABLE 2

| Properties | Properties of heavy catalytic cracking gasoline |
|---|---|
| Density (g/cc at 15° C.) | 0.780 |
| Sulfur content (ppm by mass) | 61.8 |
| Paraffin content (% by volume) | 4.4 |
| Isoparaffin content (% by volume) | 25.6 |
| Olefin content (% by volume) | 25.5 |

TABLE 2-continued

| | |
|---|---|
| Naphthene content (% by volume) | 12.6 |
| Aromatic content (% by volume) | 31.7 |
| GC-RON | 89.5 |

| Distillation efflux volume (%) | Efflux temperature (° C.) |
|---|---|
| Initial boiling point (IBP) | 88.2 |
| 10 | 97.8 |
| 50 | 129.5 |
| 90 | 182.3 |
| 95 | 192.7 |
| Final boiling point (FBP) | 202.7 |

Desulfurization rate (%)=[($S_f$-$S_p$)/$S_f$]×100

Olefin hydrogenation rate (%)=[($U_f$-$U_p$)/$U_f$]×100

Aromatic hydrogenation rate (%)=[($A_f$-$A_p$)/$A_f$]×100

Olefin-reduction rate ($\Delta$GC-RON)=[Octane number of product oil (GC-RON)]-[Octane number of starting oil (GC-RON)]

In the formulae:

$S_f$: sulfur content in the starting material (% by mass)
$S_p$: sulfur content in the hydrotreated product oil (% by mass)

$U_f$: olefin content in the starting material (% by volume)
$U_p$: olefin content in the hydrotreated product oil (% by volume)
$A_f$: aromatic content in the starting material (% by volume)
$A_p$: aromatic content in the hydrotreated product oil (% by volume)

Table 3 shows the hydrodesulfurization activities and hydrogenation activities of Catalysts A to H prepared in Examples 1 to 8 and Catalysts I to K prepared in Comparative Examples 1 to 3 on the heavy catalytic cracking gasoline having the properties shown in Table 2 obtained by carrying out the hydrogenation reaction. As shown in Table 3, Catalysts A to H according to the present invention each exhibited a high desulfurization performance of 90% or more. Moreover, since the hydrogenation activity was suppressed, the decrease of the octane number determined by the gas chromatography (ΔGC-RON) is 1.3 or less, which indicates that selective desulfurization proceeded. Although Catalysts I to K of Comparative Examples showed higher desulfurization activities than Catalysts A to H with the use of the oxygen-containing carbonaceous material-supporting support, the former catalysts showed decreases of the octane number (ΔGC-RON) exceeding 1.4 due to the hydrogenation of olefins that had proceeded simultaneously. Namely, the octane numbers largely lowered.

TABLE 3

| Catalyst | Ex. 1 A | Ex. 2 B | Ex. 3 C | Ex. 4 D |
|---|---|---|---|---|
| Reaction temperature (° C.) | 260 | 260 | 260 | 260 |
| Reaction pressure (MPa) | 1 | 1 | 1 | 1 |
| LHSV (h$^{-1}$) | 4 | 4 | 4 | 4 |
| H$_2$/oil ratio (NL/L) | 100 | 100 | 100 | 100 |
| Sulfuration temperature (° C.) | 320 | 320 | 320 | 320 |
| Desulfurization rate (%) | 93.8 | 95.1 | 94.3 | 92.1 |
| Total olefin hydrogenation rate (%) | 14.2 | 12.1 | 12.8 | 13.5 |
| Aromatic hydrogenation rate (%) | 0.5 | 0.4 | 0.2 | 0.9 |
| GC-RON | 88.1 | 88.5 | 88.4 | 88.3 |
| ΔGC-RON | −1.3 | −1.0 | −1.1 | −1.2 |

| Catalyst | Ex. 5 E | Ex. 6 F | Ex. 7 G | Ex. 8 H |
|---|---|---|---|---|
| Reaction temperature (° C.) | 260 | 260 | 260 | 260 |
| Reaction pressure (MPa) | 1 | 1 | 1 | 1 |
| LHSV (h$^{-1}$) | 4 | 4 | 4 | 4 |
| H$_2$/oil ratio (NL/L) | 100 | 100 | 100 | 100 |
| Sulfuration temperature (° C.) | 320 | 320 | 320 | 320 |
| Desulfurization rate (%) | 93.4 | 94.9 | 94.7 | 91.9 |
| Total olefin hydrogenation rate (%) | 13.3 | 10.8 | 12.0 | 9.7 |
| Aromatic hydrogenation rate (%) | 0.4 | 0.3 | 0.4 | 0.2 |
| GC-RON | 88.3 | 88.6 | 88.5 | 88.7 |
| ΔGC-RON | −1.2 | −0.9 | −1.0 | −0.8 |

TABLE 3-continued

| Catalyst | Comp. Ex. 1 I | Comp. Ex. 2 J | Comp. Ex. 3 K |
|---|---|---|---|
| Reaction temperature (° C.) | 260 | 260 | 260 |
| Reaction pressure (MPa) | 1 | 1 | 1 |
| LHSV (h$^{-1}$) | 4 | 4 | 4 |
| H$_2$/oil ratio (NL/L) | 100 | 100 | 100 |
| Sulfuration temperature (° C.) | 320 | 320 | 360 |
| Desulfurization rate (%) | 98.5 | 95.2 | 98.9 |
| Total olefin hydrogenation rate (%) | 20.0 | 19.0 | 41.6 |
| Aromatic hydrogenation rate (%) | 0.8 | 0.5 | 1.0 |
| GC-RON | 88.0 | 88.1 | 87.5 |
| ΔGC-RON | −1.5 | −1.4 | −2.1 |

The invention claimed is:

1. A porous inorganic oxide support comprising an oxygen-containing carbonaceous material supported thereon,
   wherein the oxygen-containing carbonaceous material is formed by carbonizing an oxygen-containing organic compound,
   wherein a ratio of a supported carbon amount with respect to a mass of the support for preparing the catalyst is from 0.05 to 0.2,
   wherein an atomic ratio of a supported hydrogen amount with respect to the supported carbon amount is from 0.4 to 1.0, and
   wherein an atomic ratio of a supported oxygen amount with respect to the supported carbon amount is from 0.1 to 0.6.

2. The porous inorganic oxide support according to claim 1, wherein the oxygen-containing organic compound is a saccharide or derivative thereof.

3. A hydrotreating catalyst for catalytic cracking gasoline, comprising
   the porous inorganic oxide support according to claim 1; and
   a catalyst containing a Group 8 metal of the periodic table, molybdenum (Mo), phosphorus and sulfur, which is supported on the porous inorganic oxide support.

4. The hydrotreating catalyst for catalytic cracking gasoline according to claim 3, wherein the average coordination number [N(Mo)] of the molybdenum atoms around the molybdenum atom is from 1.5 to 2.5 and the average coordination number [N(Mo)] of the sulfur atoms around the molybdenum atom is from 3.5 to 5.0 when MoS$_2$ structure in the catalyst is measured in accordance with the extended X-ray absorption fine structure (EXAFS) analysis.

* * * * *